(12) United States Patent
Brown

(10) Patent No.: US 9,332,748 B2
(45) Date of Patent: May 10, 2016

(54) AERIAL SAFETY SYSTEM

(71) Applicant: Peter M. Brown, Hampden, ME (US)

(72) Inventor: Peter M. Brown, Hampden, ME (US)

(*) Notice: Subject to any disclaimer, the term of this patent is extended or adjusted under 35 U.S.C. 154(b) by 1 day.

(21) Appl. No.: 14/291,952

(22) Filed: May 30, 2014

(65) Prior Publication Data

US 2015/0345695 A1 Dec. 3, 2015

Related U.S. Application Data

(63) Continuation-in-part of application No. 13/492,971, filed on Jun. 11, 2012, now abandoned.

(51) Int. Cl.
| | |
|---|---|
| *E06C 1/34* | (2006.01) |
| *A01M 31/02* | (2006.01) |
| *A62B 35/00* | (2006.01) |
| *A63B 27/00* | (2006.01) |

(52) U.S. Cl.
CPC ............ *A01M 31/02* (2013.01); *A62B 35/0037* (2013.01); *A63B 27/00* (2013.01); *E06C 1/34* (2013.01)

(58) Field of Classification Search
USPC ................ 248/229.23, 229.24, 230.4, 230.5, 248/230.6, 231.51, 231.61, 316.5, 316.6, 248/229.2; 182/206
See application file for complete search history.

(56) References Cited

U.S. PATENT DOCUMENTS

| | | | | |
|---|---|---|---|---|
| 3,336,999 | A | * | 8/1967 | McSwain ............... 182/20 |
| 4,090,587 | A | | 5/1978 | Pyle |
| 4,467,890 | A | | 8/1984 | McCallum et al. |
| 4,469,195 | A | * | 9/1984 | Sartain ............... 182/206 |
| 4,946,004 | A | | 8/1990 | Henson |
| 5,332,063 | A | | 7/1994 | Amacker |
| 5,638,916 | A | | 6/1997 | Schneider |
| 7,963,368 | B2 | | 6/2011 | Scudera et al. |
| 8,011,476 | B1 | * | 9/2011 | Alcon ............... 182/206 |
| 8,122,998 | B2 | | 2/2012 | Liles |
| 8,997,932 | B1 | * | 4/2015 | Ochoa ............... 182/206 |
| 2009/0242328 | A1 | * | 10/2009 | Cabrera et al. ......... 182/111 |
| 2010/0018803 | A1 | | 1/2010 | Schwenke et al. |

* cited by examiner

*Primary Examiner* — Alfred J Wujciak
(74) *Attorney, Agent, or Firm* — Anthony D. Pellegrini

(57) ABSTRACT

An apparatus to assist with placing a climbing device and safety tether into a tree or other tall upwardly extending object and then securing the climbing device and safety tether to that object, by use of a gripping ring dimensioned to substantially encircle the object and having gripping members disposed along its inner surface to engage with the object, where the gripping ring has a climbing device attachment component to attach the climbing device, such as a ladder or a rope, to the gripping ring, a safety tether attachment component to attach the safety tether to the gripping ring, and a positioning device attachment component to allow a positioning device, such as a pole, to be used to properly position the gripping ring.

17 Claims, 4 Drawing Sheets

AERIAL SAFETY SYSTEM

CROSS REFERENCE TO RELATED APPLICATIONS

This application is a continuation in part of U.S. Ser. No. 13/492,971, filed Jun. 11, 2011 and currently pending, entitled Aerial Safety System, by Brown, Peter M., which is hereby incorporated by reference.

BACKGROUND OF THE INVENTION

1. Technical Field

The present invention relates generally to the field of safety equipment. More particularly, the present invention is directed to safety equipment related to tree stands and other devices where persons may be involved in activities above the ground, such as utility pole linemen.

2. Description of Prior Art

The use of tree stands is a popular method for hunting game animals. A tree stand, comprising a platform suitably adapted to support one or more hunters, is placed in a tree and secured thereto. A climbing device is used to gain access to the tree stand. The climbing device may be a rope, a ladder, rungs embedded into the tree, or other suitable means to ascend into the tree stand. The tree stand itself typically comprises safety devices, both to secure the tree stand to the tree and the hunter to the tree stand. Alternatively, the hunter may be secured directly to the tree once in the tree stand. The hunter ascends the tree using the climbing device and enters the tree stand, whereupon the hunter waits for a suitable game animal to approach.

Once a tree stand is secured to a tree and all applicable safety devices are in place, the hunter is relatively safe ascending the tree and remaining in the tree stand. However, placing the tree stand in the tree in the first instance as well as initially placing the climbing device has always been dangerous. Typically, the hunter would have to climb the tree, with no safety devices, and then haul up the components of the tree stand and climbing device. During this period of time the hunter would be at heightened risk of falling out of the tree.

One method of providing safety to a climber during the installation of the tree stand and climbing device is to provide incremental safety during the first ascent of the tree. For example, much like a rock climber, the climber ascending the tree could insert a piton or other fixed object into the tree while still relatively low to the ground, attach a safety line to the fixed object, and then climb higher into the tree. This process is repeated as elevation is gained, as many times as needed. While this method does provide safety, it is slow and requires the placement of fixed objects all along the trunk of the tree.

Another method involves placing a ladder against the tree and securing it to the tree, usually by a set of straps encircling the tree. By necessity, the first securing strap will be placed around the tree at a low level; the climber will then climb the partially secured ladder and place another securing strap higher up, and then repeat the process as elevation is gained. Again, this method is slow and exposes the climber to a degree of danger when the ladder is only partially secured to the tree.

What these methods lack, and what is needed, is a means for securing a safety device to a tree at a high level above the ground while the climber is still safely on the ground. Such a method should also be easy and quick to use, and should not require permanent attachment to the tree or the temporary use of belts or girdles to provide intermediate security.

It is thus an object of the present invention to provide a safety device that can be placed high in a tree by a user remaining safely on the ground.

It is a further object of the present invention to provide a safety device that is quick and easy to use.

It is yet a further object of the present invention to provide a safety device that does not permanently attach to the tree.

It is yet a further object of the present invention to provide a safety device that is inexpensive to manufacture.

It is yet a further object of the present invention to provide a safety device that may be used on other tall objects, such as utility poles.

It is yet a further object of the present invention to provide a safety device that may be used on with any number of different climbing devices, such as ropes, fixed ladders, rope ladders, and the like.

Other objects of the present invention will be readily apparent from the description that follows.

SUMMARY OF THE INVENTION

The present invention comprises a safety device that may be placed in and secured to a tree or other tall object, such as a utility pole, at a high level above the ground while the user remains on the ground (for the sake of simplicity, all further references to a "tree" should be understood to pertain to any like object, such as utility poles). The safety device comprises a gripping ring which is shaped to substantially encircle the circumference of the tree. The gripping ring comprises interior oriented gripping members which engage with the tree. When the gripping ring is placed around the tree and the gripping members engage with the tree, the gripping members prevent the gripping ring from moving relative to the tree. A safety tether, attached to the gripping ring, is secured to the climber. The climber uses a climbing device which is also attached to the gripping ring to ascend the tree. The weight of the climber on the climbing device provides a downward force on the gripping member, firmly setting it into the tree. The safety tether provides immediate safety to the climber, beginning from before the ascent is commenced and continuing for the duration of the ascent. The gripping ring can be placed into the tree by use of any suitable elongate device, such as a pruning hook or a telescoping pole.

In one embodiment the gripping ring is comprised of two movable arms which can be placed in an open state, allowing the ring to be easily placed around the tree, and a closed state, in which the arms of the gripping ring are brought together to create a tighter fit of the gripping ring around the tree trunk. Variations of this embodiment provide for automatic movement of the arms of the gripping member into the open and closed states and for remote activation of this movement. Yet other variations provide for a latching mechanism integrated with the gripping ring that allows the relative positions of the arms of the gripping ring to be locked in relation to each other, either in an open state (to facilitate installation of the gripping ring into the tree) or in a closed state (to secure the gripping ring to the tree).

Other features and advantages of the present invention are described below.

DETAILED DESCRIPTION OF THE INVENTION

Figure 4:
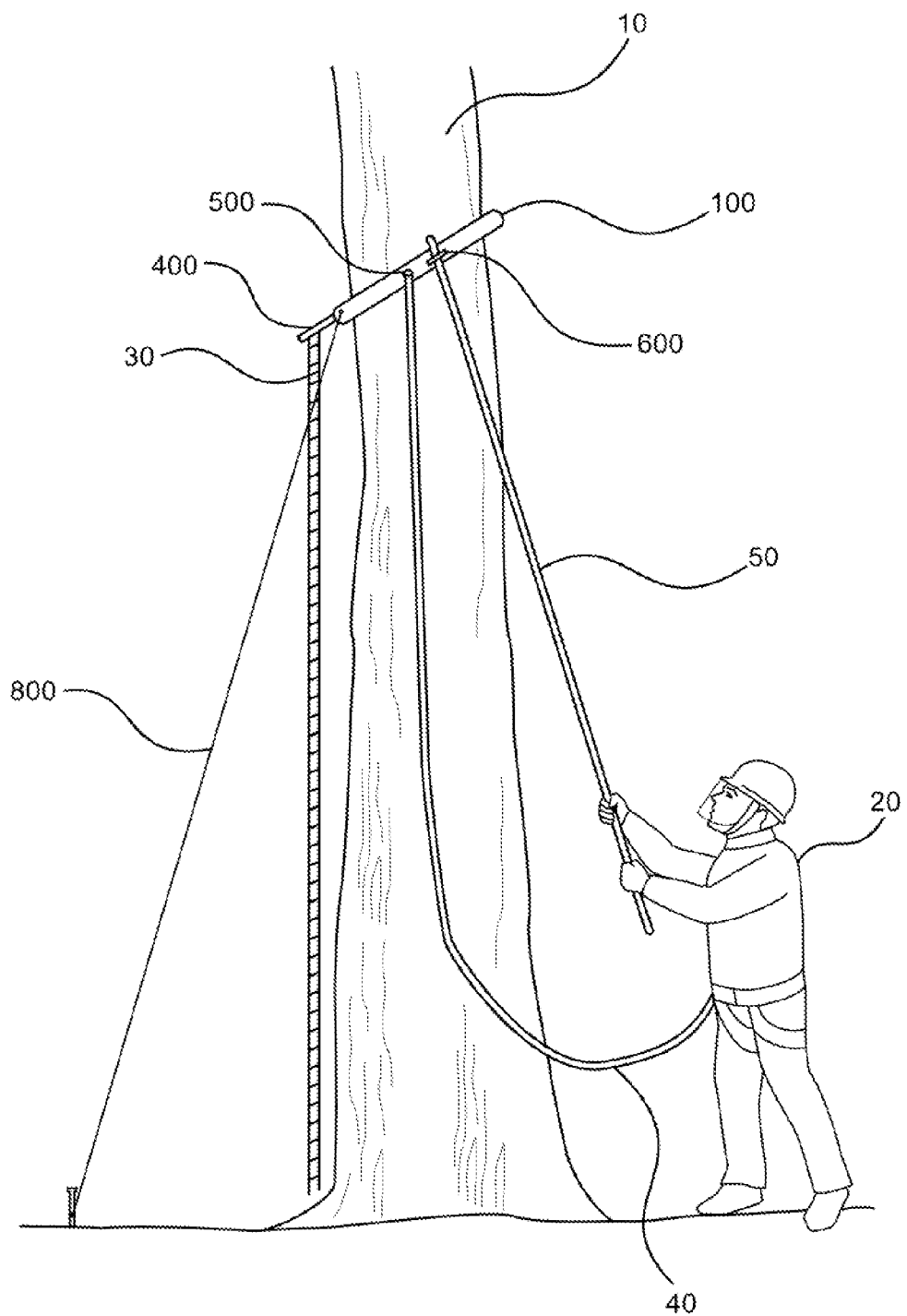
FIG. 4 is a stylized depiction of one embodiment of the invention being placed in a tree (for completeness, the anchoring device and safety tether are also shown, though they would not be engaged until after the device was placed in the tree).

The present invention comprises an apparatus 1 to assist with placing a climbing device 30 and safety tether 40 into a tree 10 or other high object and securing the climbing device 30 and safety tether 40 thereto. See FIG. 4. The apparatus 1 comprises a gripping ring 100 suitably adapted to be attached to both the climbing device 30 and the safety tether 40, such that when the gripping ring 100 is placed in the tree 10 and secured thereto the climbing device 30 and safety tether 40 are also secured thereto.

Figure 1:
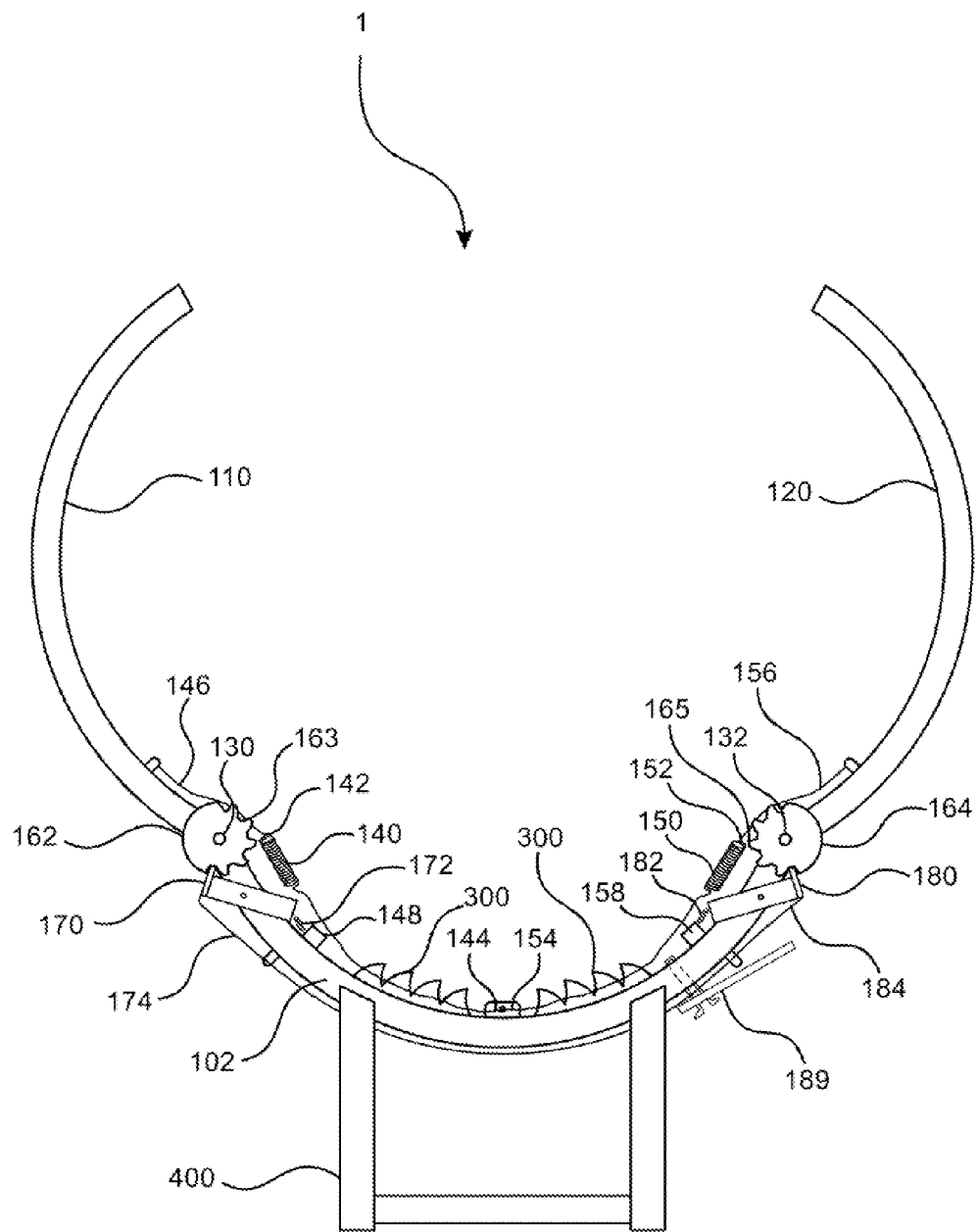
FIG. 1 is a top plan view of one embodiment of the present invention, with the apparatus in the open state.

The gripping ring 100 is substantially rigid and shaped and dimensioned to substantially encircle a tree 10, extending a minimum of 270 degrees. See FIG. 1. As such it forms an open interior. The gripping ring 100 may be of a regular shape, such as ovoid, square, hexagonal, or the like, or of an irregular shape, as desired. The preferred embodiment discloses a gripping ring 100 that is substantially circular. It may be constructed of any suitably durable and rigid material. In the preferred embodiment it is constructed of steel, though other materials may also be used, such as aluminum, high impact plastic, carbon fiber, composites, and the like.

The gripping ring 100 may be monolithic, without moving components. In such a configuration, the gripping ring 100 must be an open ring, so that the gripping ring 100 can be placed around a tree 10 by moving the opening of the gripping ring 100 over the tree 10. The smaller the opening the more secure the gripping ring 100. However, if the opening is too small the apparatus 1 will not be useful for use with larger trees 10.

Figure 2:
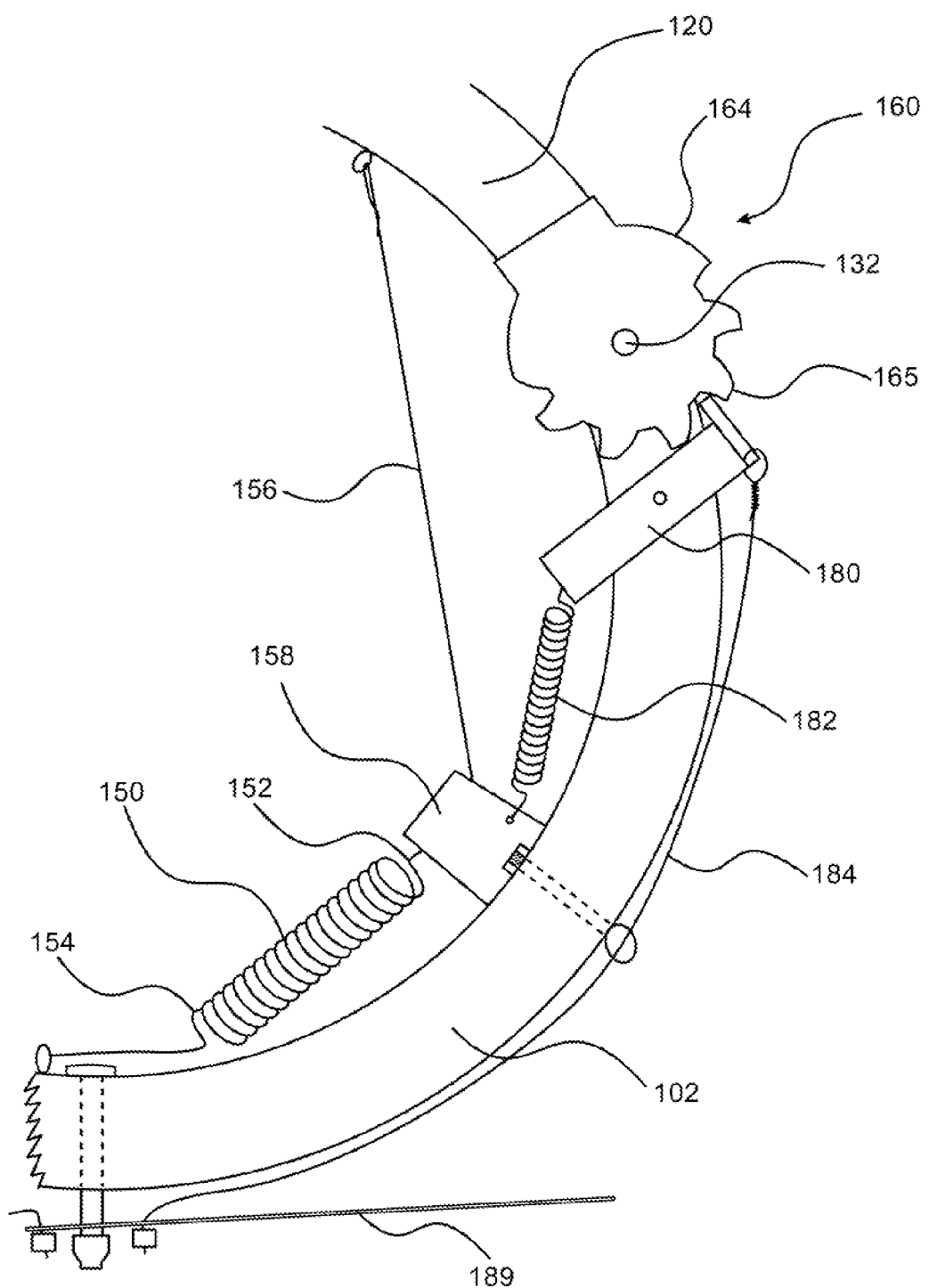
FIG. 2 is a close up top plan view of the embodiment depicted in FIG. 1.
Figure 3:
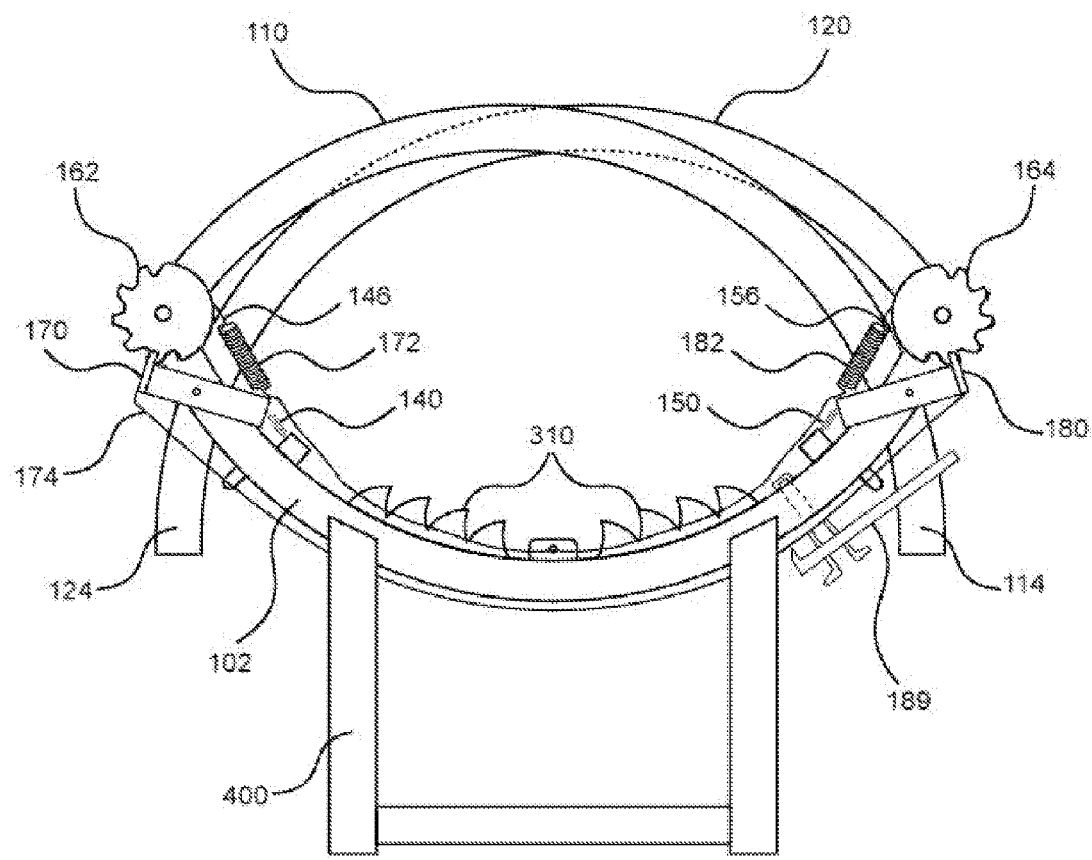
FIG. 3 is a top plan view of the embodiment of the present invention depicted in FIG. 1, with the apparatus in the closed state.

In the preferred embodiments the gripping ring 100 is comprised of a frame 102, a first arm 110, a second arm 120, a first pivot member 130, and a second pivot member 132, with the first arm 110 being in pivotal connection with the frame 102 by the first pivot member 130 and the second arm 120 being in pivotal connection with the frame 102 by the second pivot member 132, such that the first and second arms 110,120 are capable of moving in relation to the frame 102 and to each other. See FIG. 2. Each of the arms 110,120 has a first end and a second end 114,124, with the respective first ends in connection with the respective pivot members 130, 132. In these embodiments the gripping ring 100 may also be an open ring, but the size of the opening need not be a limiting factor in the use of the apparatus 1, as the opening can be widened by pivoting the first and second arms 110,120 away from each other to allow the gripping ring 100 to be placed around a large tree 10, and then the opening can be narrowed by pivoting the first and second arms 110,120 towards each other. In the most preferred embodiments the gripping ring 100 is a closed ring, and the gripping ring 100 has a closed state and an open state. The closed state of the gripping ring 100 is an orientation of the first and second arms 110,120 of the gripping ring 100 such that the second end 114 of the first arm 110 circumferentially overlaps the second end 124 of the second arm 120. See FIG. 3. The open state of the gripping ring 100 is an orientation of the first and second arms 110,120 of the gripping ring 100 such that the second end 114 of the first arm 110 is apart from the second end 124 of the second arm 120. See FIG. 1.

The second ends 114,124 of the first and second arms 110,120 overlap each other in the closed state by each arm being offset from the plane of the gripping ring 100, in opposite directions. For example, the first arm 110 may be offset upward at is second end 114 in relation to the plane of the gripping ring 100, while the second arm 120 may be offset downward at is second end 124 in relation to the plane of the gripping ring 100. Similarly, the first arm 110 may be offset downward at is second end 114 in relation to the plane of the gripping ring 100, while the second arm 120 may be offset upward at is second end 124 in relation to the plane of the gripping ring 100, while the second arm 120 may be angled upward at is second end 124 in relation to the plane of the gripping ring 100. In other embodiments where the gripping ring 100 is an open ring, the closed state of the gripping ring 100 is an orientation of the first and second arms 110,120 of the gripping ring 100 such that the second end 114 of the first arm 110 is in closest proximity to the second end 124 of the second arm 120, and the open state of the gripping ring 100 is an orientation of the first and second arms 110,120 of the gripping ring 100 such that the second end 114 of the first arm 110 is further away from the second end 124 of the second arm 120 than when the gripping ring 100 is in the closed state.

In the embodiments in which the gripping ring 100 comprises both a first and second arm 110,120, the pivoting movement of the arms 110,120 in relation to each other may be facilitated by a pair of ring springs 140, 150. The first ring spring 140 is connected at one end 142 to the first arm 110 of the gripping ring 100 proximate to the first end of the first arm 110 and on the inside of the gripping ring 100, and connected at its other end 144 to the frame 102. So connected, the first ring spring 140 is suitably adapted to bias the second end 114 of the first arm 110 toward the second arm 120. Similarly, the second ring spring 150 is connected at one end 152 to the second arm 120 of the gripping ring 100 proximate to the first end of the second arm 120 and on the inside of the gripping ring 100, and connected at its other end 154 to the frame 102. So connected, the second ring spring 150 is suitably adapted to bias the second end 124 of the second arm 120 toward the first arm 110. The biasing action of the first and second ring springs 140, 150 thereby moves the second ends 114,124 of the first and second arms 110,120 toward each other, assisting with placing the gripping ring 100 in the closed state. See FIGS. 1, 2, and 3.

In one embodiment of the foregoing configuration, a first extension cable 146 is interposed between the first end 142 of the first ring spring 140 and the first arm 110 of the gripping ring 100. This provides extended length to the biasing first ring spring 140. The first extension cable 146 may be made of any flexible, non-stretching material. In the preferred embodiment it is made of multi-stranded metal wire. When coupled with a first redirecting member 148, which is fixedly attached to the frame 102 of the gripping ring 100 and has an aperture through which the first extension cable 146 passes, the biasing effect of the first ring spring 140 is transmitted over a longer distance closer to the inner edge of the gripping ring 100. See FIG. 1. The first redirection member 148 may be configured in any manner that serves the stated purpose. In one embodiment it is an eye hook. This configuration increases the effectiveness of the first ring spring 140 while minimizing the necessity of having the first ring spring 140 span the open interior of the gripping ring 100. Likewise, and a second extension cable 156 may be interposed between the first end 152 of the second ring spring 150 and the second arm 120 of the gripping ring 100. A second redirecting member 158, also being fixedly attached to the frame 102 of the gripping ring 100 and having has an aperture through which the second extension cable 156 passes, may be configured and used in a similar manner When the ring springs 140,150 are used, it may be desirable to temporarily oppose the biasing capability of the ring springs 140,150 so that the gripping ring 100 may be retained in the open state. In such cases the gripping ring 100 further comprises a retention assembly 160. The retention assembly 160 is located proximate to the pivot members 130,132 of the first and second arms 110, 120 and is suitably adapted to hold the first arm 110 of the gripping ring 100 in fixed relation to the second arm 120 of the gripping ring 100 in the open state in opposition to the biasing tendency of the ring springs 140,150. The retention assembly 160 is also suitably adapted to hold the first arm 110 of the gripping ring 100 in fixed relation to the second arm 120 of the gripping ring 100 in the closed state, thereby serving as a locking mechanism to increase the safety of the apparatus 1 during use. The retention assembly 160 is further adapted to be capable of releasing the first arm 110 and the second arm 120 from the open state, thereby permitting the ring springs 140,150 to move the second ends 114,124 of the first and second arms 110,120 of the gripping ring 100 relative to each other, and of releasing the first arm 110 and the second arm 120 from the closed state, thereby permitting the second ends 114,124 of the first and second arms 110,120 of the gripping ring 100 to be moved away from each other, thereby unlocking the apparatus 1.

In one embodiment the retention assembly 160 comprises a first gear 162, a second gear 164, a first latch 170, and a second latch 180. The first gear 162 is fixedly attached to the first end of the first arm 110 of the gripping ring 100. It is substantially planar and substantially circular in shape, and has a plurality of teeth 163 arrayed about its perimeter. The second gear 164 is fixedly attached to the first end of the second arm 120 of the gripping ring 100. It is similarly configured as the first gear 162. Both the first and second gears 162,164 are constructed of a rigid material, preferably steel. They may be attached to the first and second arms 110,120, respectively, by any known means, such as by welding, screws, rivets, adhesives, and the like. The first latch 170 is pivotally attached to the frame 102 of the gripping ring 100 proximate to the first end of the frame 102. The first latch 170 is suitably adapted to engage with and to disengage from the plurality of teeth 163 of the first gear 162. This may be accomplished by an end of the first latch 170 being shaped to engage with the plurality of teeth 163 of the first gear 162, or by the first latch 170 having associated with it a projection that is shaped to engage with the plurality of teeth 163 of the first gear 162. In the preferred embodiment the first latch 170 is a substantially rectangular, elongate structure having a pivot proximate to its center. The first latch 170 further has a biasing spring 172 suitably adapted to bias the first latch 170 such that the first latch 170 pivots towards the first gear 162 and engages with the plurality of teeth 163 of the first gear 162. The biasing spring 172 is connected at one end to the frame 102 and at another end to the first latch 170 at the end of the first latch 170 that is opposite the end of the first latch 170 that engages with the plurality of teeth 163 of the first gear 162. The first latch 170 also has a control cord 174 suitably adapted to move the first latch 170 such that it disengages from the plurality of teeth 163 of the first gear 163. The control cord 174 is made of any flexible string-like material. It is connected at one end to the end of the first latch 170 that engages with the plurality of teeth 163 of the first gear 162, and the other end of the control cord is accessible to the user 20. When the user pulls on the end of the control cord 174, it causes the first latch 170 to pivot away from the first gear 162 in a manner that disengages the first latch 170 from the plurality of teeth 163 of the first gear 162. The second latch 180 is similarly configured as the first latch 170, and is pivotally attached to the frame 102 of the gripping ring 100 proximate to the second end of the frame 102 and has a biasing spring 182 and a control cord 184 and operates in the same manner as the first latch 170. The control cord 174 of the first latch 170 and the control cord 184 of the second latch 180 may be joined to a release cord, whereby a user 20 pulling on the release cord will cause both the first and second latches 170,180 to simultaneously disengage from the first and second gears 162,164, respectively. Alternatively, the control cord 174 of the first latch 170 and the control cord 184 of the second latch 180 may be joined to a release lever 189, whereby a user 20 pulling on the release lever 189 will cause both the first and second latches 170,180 to simultaneously disengage from the first and second gears 162,164, respectively. Because of the biasing action of the springs 172,182 of the first and second latches 170,180, the passive state of the apparatus 1 is locked. That is, the first and second latches 170,180 will tend to remain engaged with the first and second gears 162,164 whenever the apparatus 1 is being used, whether in the open position or the closed position. Only by active manipulation of the first and second latches 170,180 by their control cords 174,184 are the first and second arms 110,120 of the gripping ring 100 allowed to move relative to each other. This makes the apparatus 1 very safe, in that it cannot inadvertently revert to the open state.

In an alternative embodiment of the retention assembly 160 the first gear 162 is fixedly attached to the frame 102 of the gripping ring 100 proximate to the first end of the frame 102, and the second gear 164 is fixedly attached to the frame 102 proximate to the second end of the frame 102. The first latch 170 is pivotally attached to the first arm 110 of the gripping ring 100 proximate to the first end of the first arm 110, and the second latch 180 is pivotally attached to the second arm 120 of the gripping ring 100 proximate to the first end of the second arm 120. The biasing spring 172 of the first latch 170 is connected at one end to the first arm 110 and at another end to the first latch 170 as described above. The biasing spring 182 of the second latch 180 is connected at one end to the second arm 120 and at another end to the second latch 180 as described above. The operations of the first and second gears 162,163 and the first and second latches 170,180 are as described above.

The gripping ring 100 may further comprise a pair of spring tensioners. The first spring tensioner is in connection with the first ring spring 140 and is suitably adapted to either increase or decrease the tension of the first ring spring 140. When the tension in the first ring spring 140 is increased the first ring spring 140 exerts a greater biasing tendency and when the tension in the first ring spring 140 is decreased the first ring spring 140 exerts less biasing tendency. Increasing biasing tendency facilitates movement of the first and second arms 110,120 of the gripping ring 100 in relation to each other, while lessened biasing tendency facilitates easier removal of the gripping ring 100 from the tree 10. The second spring tensioner is in connection with the second ring spring 150 and operates on the second ring spring 150 in the same manner as the first spring tensioner operates on the first ring spring 140.

The gripping ring 100 has one or more gripping members 300 attached to it. See FIGS. 1 and 3. Each gripping member 300 is attached to the gripping ring 100 on the inside portion of the gripping ring 100, and extends inward into the open interior formed by the gripping ring 100. So configured, the one or more gripping members 300 are directed towards the tree 10 when the gripping ring 100 is placed around the tree 10. The gripping members 300 can be configured in any suitable shape and dimension, provided that they are suitable for engaging with the tree 10. Gripping members 300 may be inwardly oriented spikes, or flanges, or geometric shapes. In the preferred embodiment the gripping members 300 are comprised of one or more substantially triangular teeth 310, each with a base proximate to the gripping ring 100 and the apex oriented inward. In alternative embodiments the teeth 310 may be of different sizes and dimensions; in other embodiments, the teeth 310 are all of substantially the same size and dimension. The gripping members 300 must be rigid and durable, and can be made of any suitable material. In the preferred embodiment it is constructed of steel, though other materials may also be used, such as aluminum, high impact plastic, carbon fiber, composites, and the like. Where the gripping members 300 and the gripping ring 100 are both made of a metallic material, the gripping members 300 may be welded to the gripping ring 100. Alternatively, they may be attached using mechanical fasteners, or even formed monolithically of the same material as the gripping ring 100. It is imperative that the gripping members 300 be fixedly attached to the gripping ring 100 and in a nonmoving relation to the gripping ring 100.

In one embodiment the gripping ring 100 comprises four gripping members 300, arranged in two set of two. The first pair of gripping members 300 is attached to the first arm 110 of the gripping ring 100 and located substantially midway between the first end of the first arm 110 and the second end 114 of the first arm 110, with the two gripping members 300 of the first pair being spaced apart from each other. The second pair of gripping members 300 is attached to the second arm 120 of the gripping ring 100 in the same way, located substantially midway between the first end of the second arm 120 and the second end 124 of the second arm 120 and spaced apart from each other.

In another embodiment the gripping ring 100 comprises two gripping members 300, with the first gripping member 300 attached to the first arm 110 of the gripping ring 100 and located substantially midway between the first end of the first arm 110 and the second end 114 of the first arm 110, and the second gripping member 300 attached to the second arm 120 of the gripping ring 100 and located substantially midway between the first end of the second arm 120 and the second end 124 of the second arm 120.

In other embodiments the number of gripping members 300 can vary, with different numbers located on the first arm 110 as compared to the second arm 120. In yet other embodiments the gripping members 300 can be adjusted so that they are not in fixed relationship to each other but can be repositioned as needed to better accommodate the specific tree 10 into which the apparatus 1 is to be placed.

In the preferred embodiment the gripping ring 100 comprises a plurality of gripping members 300, with the gripping members 300 attached to the frame 102 of the gripping ring 100. See FIGS. 1 and 3.

The gripping ring 100 has a climbing device attachment component 400 extending outward from the frame 102 of the gripping ring 100. The climbing device attachment component 400 is suitably adapted to secure the climbing device 30 to the gripping ring 100. It is important to note, however, that the climbing device 30 is not a component of the apparatus 1, but is merely suitable for use with the apparatus 1. This keeps the size and weight of the apparatus 1 to a minimum, as well as allowing for any number of different climbing devices 30 to be used, as desired. The climbing device attachment component 400 can have any suitable size and configuration. In the preferred embodiment, the climbing device attachment component 400 is a substantially rectangular three sided bracket extending outward from the frame 102 of the gripping ring 100. See FIGS. 1 and 3. In other embodiments the climbing device attachment component 400 may be a curved bar or even a pair of hooks or eyelets. The climbing device attachment component 400 may be pivotally attached to the frame 102 of the gripping ring 100, whereby the climbing device attachment component 400 is suitably adapted to pivot in an upward direction relative to the gripping ring 100. This allows the climbing device attachment component 400 to be positioned substantially parallel to the ground when the gripping ring 100 is pitched downward against the tree 10. See FIG. 4.

The gripping ring 100 may further comprise a safety tether attachment component 500 located on an outer portion of the frame 102 of the gripping ring 100. See FIG. 4. The safety tether attachment component 500 is suitably adapted to secure a safety tether 40 to the gripping ring 100. The safety tether attachment component 500 can have any suitable size and configuration. In the preferred embodiment it is an eyelet.

The gripping ring 100 may further comprise a positioning device attachment component 600 located on an outer portion of the frame 102 of the gripping ring 100. See FIG. 4. The positioning device attachment component 600 is suitably adapted to removably attach a positioning device 50 to the gripping ring 100. The positioning device 50 may be any object that allows the gripping ring 100 to be placed in the tree 10, such as a long pole or a pruning hook. The positioning device attachment component 600 can have any suitable size and configuration. In one embodiment it is an open sleeve into which an end of the positioning device 50 may be inserted. In another embodiment the positioning device attachment component 600 is pivotally attached to the gripping ring 100, whereby the positioning device attachment component 600 is suitably adapted to pivot in an upward direction relative to the gripping ring 100, or conversely, for the gripping ring 100 to pivot in a downward direction relative to the positioning device attachment component 600. This configuration allows the apparatus to be positioned as desired with the positioning device 50 and then, by means of a tether, the gripping ring 100 can be pulled downward to engage with the tree.

In other embodiments the apparatus 1 further comprises a positioning device adapter. The positioning device adapter is suitably adapted to be removably attached to the positioning device 50, and to further removably attach the positioning device 50 to the gripping ring 100. The use of a positioning device adapter allows one 20 to use virtually any object as a positioning device 50, such as fallen branches. In one embodiment the positioning device adapter comprises a clamp that is capable of securing the positioning device adapter to the positioning device 50, and a flange that is suitably dimensioned to removably engage with the positioning device attachment component 600. In another embodiment the positioning device adapter further includes flanges for engaging with the climbing device attachment component 400, which in said embodiment also acts as a positioning device attachment component 600.

In the preferred embodiments, the apparatus 1 further comprises an anchoring device 800. See FIG. 4. The anchoring device 800 has a first end and a second end, with the first end of the anchoring device 800 being suitably adapted to being attached to the gripping ring 100. The second end of the anchoring device 800 is suitably adapted to being attached to an anchoring object located below the gripping ring 100 when the gripping ring 100 is placed on the tree 10. An anchoring object may include the ground by use of a stake. The anchoring device 800 is capable of maintaining tension between the gripping ring 100 and the anchoring object, ensuring that the gripping ring 100 remains engaged with the tree 10 as the climber 20 ascends the climbing device 30.

Modifications and variations can be made to the disclosed embodiments of the apparatus 1 without departing from the subject or spirit of the invention as defined in the following claims.

I claim:

1. An apparatus to be used with an upwardly extending object, said upwardly extending object having a height and a substantially circular cross section, said apparatus suitably adapted to assist with placing an independent climbing device into said upwardly extending object and securing the climbing device thereto, said apparatus comprising
    a gripping ring, said gripping ring being substantially rigid and shaped to substantially encircle the upwardly extending object, forming an open interior,
    said gripping ring having one or more gripping members, each said gripping member attached to the gripping ring and extending inward into the open interior formed by the gripping ring,
    said gripping ring having a frame, a first arm, a second arm, a first pivot member, and a second pivot member,
        said frame having a first end and a second end and being substantially curved from its first end to its second end such that an inner portion of said frame is concave,
        said first arm having a first end and a second end and being substantially curved from its first end to its second end such that an inner portion of said first arm is concave,
        said second arm having a first end and a second end and being substantially curved from its first end to its second end such that an inner portion of said second arm is concave, and
        with said first end of said first arm being in pivotal connection by the first pivot member with said first end of said frame, and said first end of said second arm being in pivotal connection by the second pivot member with said second end of said frame, such that the first and second arms are capable of moving in relation to each other,
    said gripping ring having a closed state and an open state,
        with the closed state of the gripping ring being an orientation of the first and second arms of the gripping ring such that the second end of the first arm circumferentially overlaps the second end of the second arm by said second ends each arm being offset from a plane of the gripping ring in opposite directions relative to said plane of the gripping ring, and
        with the open state of the gripping ring being an orientation of the first and second arms of the gripping ring such that the second end of the first arm is further away from the second end of the second arm than when the gripping ring is in the closed state, and
    said gripping ring having a climbing device attachment component, said climbing device attachment component extending outward from the gripping ring and being suitably adapted to secure the climbing device to the gripping ring,
    whereby the climbing device is attached to the gripping ring at the climbing device attachment component and the gripping ring is placed onto the upwardly extending object such that the gripping ring substantially encircles the upwardly extending object and the one or more gripping members of the gripping ring engage with the upwardly extending object, holding the gripping ring in place on the upwardly extending object.

2. The apparatus of claim 1 wherein the gripping ring is substantially circular.

3. The apparatus of claim 1 wherein each of the one or more gripping members comprises one or more substantially triangular teeth, with the apex of each triangular tooth oriented inward into the open interior formed by the gripping ring.

4. The apparatus of claim 1 wherein the gripping ring comprises a plurality of gripping members, with the plurality of gripping members being attached to the frame of the gripping ring.

5. The apparatus of claim 1 wherein the climbing device attachment component is a substantially rectangular three sided bracket extending outward from the frame of the gripping ring.

6. The apparatus of claim 1 wherein the gripping ring further comprises a safety tether attachment component located on an outer portion of the frame of the gripping ring, said safety tether attachment component suitably adapted to secure a safety tether to the gripping ring.

7. The apparatus of claim 1 further comprising an anchoring device, said anchoring device having a first end and an second end, said first end of the anchoring device being suitably adapted to being attached to the frame of the gripping ring, said second end of the anchoring device being suitably adapted to being attached to an anchoring object located below the gripping ring when the gripping ring is placed on the upwardly extending object,
    whereby the anchoring device is capable of maintaining tension between the gripping ring and the anchoring object.

8. An apparatus to be used with an upwardly extending object, said upwardly extending object having a height and a substantially circular cross section, said apparatus suitably adapted to assist with placing an independent climbing device into said upwardly extending object and securing the climbing device thereto, said apparatus comprising
    a gripping ring, said gripping ring being substantially rigid and shaped to substantially encircle the upwardly extending object, forming an open interior,
    said gripping ring having one or more gripping members, each said gripping member attached to the gripping ring and extending inward into the open interior formed by the gripping ring,
    said gripping ring having a frame, a first arm, a second arm, a first pivot member, and a second pivot member,
        said frame having a first end and a second end and being substantially curved from its first end to its second end such that an inner portion of said frame is concave,
        said first arm having a first end and a second end and being substantially curved from its first end to its second end such that an inner portion of said first arm is concave,
        said second arm having a first end and a second end and being substantially curved from its first end to its second end such that an inner portion of said second arm is concave, and
        with said first end of said first arm being in pivotal connection by the first pivot member with said first end of said frame, and said first end of said second arm being in pivotal connection by the second pivot member with said second end of said frame, such that the first and second arms are capable of moving in relation to each other, said gripping ring having a closed state and an open state,
- with the closed state of the gripping ring being an orientation of the first and second arms of the gripping ring such that the second end of the first arm circumferentially overlaps the second end of the second arm by said second ends each arm being offset from a plane of the gripping ring in opposite directions relative to said plane of the gripping ring, and
- with the open state of the gripping ring being an orientation of the first and second arms of the gripping ring such that the second end of the first arm is further away from the second end of the second arm than when the gripping ring is in the closed state, said gripping ring having a climbing device attachment component, said climbing device attachment component extending outward from the gripping ring and being suitably adapted to secure the climbing device to the gripping ring, and said gripping ring having a first ring spring, a second ring spring, and a retention assembly, said first ring spring connected at a first end to the first arm of the gripping ring proximate to the first end of the first arm of the gripping ring and connected at a second end to the frame of the gripping ring proximate to the first end of the frame of the gripping ring, said first ring spring suitably adapted to bias the second end of the first arm toward the second arm, said second ring spring connected at a first end to the second arm of the gripping ring proximate to the first end of the second arm of the gripping ring and connected at a second end to the frame of the gripping ring proximate to the second end of the frame of the gripping ring, said second ring spring suitably adapted to bias the second end of the second arm toward the first arm, whereby the first and second ring springs bias the second ends of the first and second arms relative to each other, placing the gripping ring in the closed state, and said retention assembly is located proximate to the first pivot member and proximate to the second pivot member, said retention assembly suitably adapted to restrain movement of the first and second pivot members so as to hold the first arm of the gripping ring in fixed relation to the second arm of the gripping ring, thereby overcoming the biasing tendency of the first and second ring springs and holding the gripping ring in the open state, whereby the climbing device is attached to the gripping ring at the climbing device attachment component and the gripping ring is placed onto the upwardly extending object such that the gripping ring substantially encircles the upwardly extending object and the one or more gripping members of the gripping ring engage with the upwardly extending object, holding the gripping ring in place on the upwardly extending object.

9. The apparatus of claim 8 wherein the gripping ring further comprises a first spring tensioner and a second spring tensioner, said first spring tensioner being in connection with the first ring spring and being suitably adapted to either increase or decrease the tension of the first ring spring, such that when the tension in the first ring spring is increased the first ring spring exerts a greater biasing tendency and when the tension in the first ring spring is decreased the first ring spring exerts less biasing tendency, and said second spring tensioner being in connection with the second ring spring and being suitably adapted to either increase or decrease the tension of the second ring spring, such that when the tension in the second ring spring is increased the second ring spring exerts a greater biasing tendency and when the tension in the second ring spring is decreased the second ring spring exerts less biasing tendency.

10. The apparatus of claim 8 wherein the retention assembly is adapted to be operated remotely.

11. The apparatus of claim 8 wherein a first extension cable is interposed between the first end of the first ring spring and the first arm of the gripping ring and a second extension cable is interposed between the first end of the second ring spring and the second arm of the gripping ring.

12. The apparatus of claim 11 wherein
- a first redirecting member is fixedly attached to the frame of the gripping ring proximate to the first end of the frame of the gripping ring, said first redirecting member having an aperture through which the first extension cable passes, and
- a second redirecting member is fixedly attached to the frame of the gripping ring proximate to the second end of the frame of the gripping ring, said second redirecting member having an aperture through which the second extension cable passes.

13. The apparatus of claim 8 wherein the retention assembly comprises
- a first gear, a second gear, a first latch, and a second latch,
    - with the first gear being fixedly attached to the first end of the first arm of the gripping ring and having a plurality of teeth arrayed about its perimeter,
    - the second gear being fixedly attached to the first end of the second arm of the gripping ring and having a plurality of teeth arrayed about its perimeter,
    - the first latch being pivotally attached to the frame of the gripping ring proximate to the first end of the frame of the gripping ring, said first latch suitably adapted to engage with and to disengage with the plurality of teeth of the first gear, with the first latch having a biasing spring suitably adapted to bias the first latch such that it engages with the plurality of teeth of the first gear, and with the first latch having a control cord suitably adapted to move the first latch such that it disengages from the plurality of teeth of the first gear, and
    - the second latch being pivotally attached to the frame of the gripping ring proximate to the second end of the frame of the gripping ring, said second latch suitably adapted to engage with and to disengage with the plurality of teeth of the second gear, with the second latch having a biasing spring suitably adapted to bias the second latch such that it engages with the plurality of teeth of the second gear, and with the second latch having a control cord suitably adapted to move the second latch such that it disengages from the plurality of teeth of the second gear,
    - whereby when the biasing spring of the first latch biases the first latch so as to cause the first latch to be engaged with the plurality of teeth of the first gear the first arm of the gripping ring is held in fixed relation to the frame of the gripping ring, and when the control cord of the first latch is manipulated to move the first latch so as to cause the first latch to be disengaged from the plurality of teeth of the first gear the first pivot member allows the first arm of the gripping ring to move in relation to the frame of the gripping ring, and when the biasing spring of the second latch biases the second latch so as to cause the second latch to be engaged with the plurality of teeth of the second gear the second pivot member is held in fixed relation to the frame of the gripping ring, and when the control cord of the second latch is manipulated to move the second latch so as to cause the second latch to be disengaged from the plurality of teeth of the second gear the second pivot member allows the second arm of the gripping ring to move in relation to the frame of the gripping ring.

14. The apparatus of claim 8 wherein the retention assembly comprises a first gear, a second gear, a first latch, and a second latch,
with the first gear being fixedly attached to the first end of the frame of the gripping ring and having a plurality of teeth arrayed about its perimeter,
the second gear being fixedly attached to the second end of the frame of the gripping ring and having a plurality of teeth arrayed about its perimeter,
the first latch being pivotally attached to the first arm of the gripping ring proximate to the first end of the first arm of the gripping ring, said first latch suitably adapted to engage with and to disengage with the plurality of teeth of the first gear, with the first latch having a biasing spring suitably adapted to bias the first latch such that it engages with the plurality of teeth of the first gear, and with the first latch having a control cord suitably adapted to move the first latch such that it disengages from the plurality of teeth of the first gear, and
the second latch being pivotally attached to the second arm of the gripping ring proximate to the first end of the second arm of the gripping ring, said second latch suitably adapted to engage with and to disengage with the plurality of teeth of the second gear, with the second latch having a biasing spring suitably adapted to bias the second latch such that it engages with the plurality of teeth of the second gear, and with the second latch having a control cord suitably adapted to move the second latch such that it disengages from the plurality of teeth of the second gear,
whereby when the biasing spring of the first latch biases the first latch so as to cause the first latch to be engaged with the plurality of teeth of the first gear the first arm of the gripping ring is held in fixed relation to the frame of the gripping ring, and when the control cord of the first latch is manipulated to move the first latch so as to cause the first latch to be disengaged from the plurality of teeth of the first gear the first pivot member allows the first arm of the gripping ring to move in relation to the frame of the gripping ring,
and when the biasing spring of the second latch biases the second latch so as to cause the second latch to be engaged with the plurality of teeth of the second gear the second pivot member is held in fixed relation to the frame of the gripping ring, and when the control cord of the second latch is manipulated to move the second latch so as to cause the second latch to be disengaged from the plurality of teeth of the second gear the second pivot member allows the second arm of the gripping ring to move in relation to the frame of the gripping ring.

15. An apparatus to be used with an upwardly extending object, said upwardly extending object having a height and a substantially circular cross section, said apparatus suitably adapted to assist with placing an independent climbing device into said upwardly extending object and securing the climbing device thereto, said apparatus comprising a gripping ring, said gripping ring being substantially rigid and shaped to substantially encircle the upwardly extending object, forming an open interior,
said gripping ring having one or more gripping members, each said gripping member attached to the gripping ring and extending inward into the open interior formed by the gripping ring,
said gripping ring having a frame, a first arm, a second arm, a first pivot member, and a second pivot member,
said frame having a first end and a second end and being substantially curved from its first end to its second end such that an inner portion of said frame is concave,
said first arm having a first end and a second end and being substantially curved from its first end to its second end such that an inner portion of said first arm is concave,
said second arm having a first end and a second end and being substantially curved from its first end to its second end such that an inner portion of said second arm is concave, and
with said first end of said first arm being in pivotal connection by the first pivot member with said first end of said frame, and said first end of said second arm being in pivotal connection by the second pivot member with said second end of said frame, such that the first and second arms are capable of moving in relation to each other,
said gripping ring having a closed state and an open state,
with the closed state of the gripping ring being an orientation of the first and second arms of the gripping ring such that the second end of the first arm circumferentially overlaps the second end of the second arm by said second ends each arm being offset from a plane of the gripping ring in opposite directions relative to said plane of the gripping ring, and
with the open state of the gripping ring being an orientation of the first and second arms of the gripping ring such that the second end of the first arm is further away from the second end of the second arm than when the gripping ring is in the closed state, and
said gripping ring having a climbing device attachment component, said climbing device attachment component extending outward from the gripping ring and being suitably adapted to secure the climbing device to the gripping ring, wherein the climbing device attachment component is a substantially rectangular three sided bracket extending outward from the frame of the gripping ring, and the climbing device attachment component is pivotally attached to the frame of the gripping ring, whereby the climbing device attachment component is suitably adapted to pivot in an upward direction relative to the gripping ring,
whereby the climbing device is attached to the gripping ring at the climbing device attachment component and the gripping ring is placed onto the upwardly extending object such that the gripping ring substantially encircles the upwardly extending object and the one or more gripping members of the gripping ring engage with the upwardly extending object, holding the gripping ring in place on the upwardly extending object.

16. An apparatus to be used with an upwardly extending object, said upwardly extending object having a height and a substantially circular cross section, said apparatus suitably adapted to assist with placing an independent climbing device into said upwardly extending object and securing the climbing device thereto, said apparatus comprising a gripping ring, said gripping ring being substantially rigid and shaped to substantially encircle the upwardly extending object, forming an open interior, said gripping ring having one or more gripping members, each said gripping member attached to the gripping ring and extending inward into the open interior formed by the gripping ring, said gripping ring having a frame, a first arm, a second arm, a first pivot member, and a second pivot member, said frame having a first end and a second end and being substantially curved from its first end to its second end such that an inner portion of said frame is concave, said first arm having a first end and a second end and being substantially curved from its first end to its second end such that an inner portion of said first arm is concave, said second arm having a first end and a second end and being substantially curved from its first end to its second end such that an inner portion of said second arm is concave, and with said first end of said first arm being in pivotal connection by the first pivot member with said first end of said frame, and said first end of said second arm being in pivotal connection by the second pivot member with said second end of said frame, such that the first and second arms are capable of moving in relation to each other, said gripping ring having a closed state and an open state, with the closed state of the gripping ring being an orientation of the first and second arms of the gripping ring such that the second end of the first arm circumferentially overlaps the second end of the second arm by said second ends each arm being offset from a plane of the gripping ring in opposite directions relative to said plane of the gripping ring, and with the open state of the gripping ring being an orientation of the first and second arms of the gripping ring such that the second end of the first arm is further away from the second end of the second arm than when the gripping ring is in the closed state, said gripping ring having a climbing device attachment component, said climbing device attachment component extending outward from the gripping ring and being suitably adapted to secure the climbing device to the gripping ring, and said gripping ring having a positioning device attachment component located on an outer portion of the frame of the gripping ring, said positioning device attachment component suitably adapted to removably attach a positioning device to the gripping ring, whereby the climbing device is attached to the gripping ring at the climbing device attachment component and the gripping ring is placed onto the upwardly extending object such that the gripping ring substantially encircles the upwardly extending object and the one or more gripping members of the gripping ring engage with the upwardly extending object, holding the gripping ring in place on the upwardly extending object.

17. An apparatus to be used with an upwardly extending object, said upwardly extending object having a height and a substantially circular cross section, said apparatus suitably adapted to assist with placing an independent climbing device into said upwardly extending object and securing the climbing device thereto, said apparatus comprising a gripping ring, said gripping ring being substantially rigid and shaped to substantially encircle the upwardly extending object, forming an open interior, said gripping ring having one or more gripping members, each said gripping member attached to the gripping ring and extending inward into the open interior formed by the gripping ring, said gripping ring having a frame, a first arm, a second arm, a first pivot member, and a second pivot member, said frame having a first end and a second end and being substantially curved from its first end to its second end such that an inner portion of said frame is concave, said first arm having a first end and a second end and being substantially curved from its first end to its second end such that an inner portion of said first arm is concave, said second arm having a first end and a second end and being substantially curved from its first end to its second end such that an inner portion of said second arm is concave, and with said first end of said first arm being in pivotal connection by the first pivot member with said first end of said frame, and said first end of said second arm being in pivotal connection by the second pivot member with said second end of said frame, such that the first and second arms are capable of moving in relation to each other, said gripping ring having a closed state and an open state, with the closed state of the gripping ring being an orientation of the first and second arms of the gripping ring such that the second end of the first arm circumferentially overlaps the second end of the second arm by said second ends each arm being offset from a plane of the gripping ring in opposite directions relative to said plane of the gripping ring, and with the open state of the gripping ring being an orientation of the first and second arms of the gripping ring such that the second end of the first arm is further away from the second end of the second arm than when the gripping ring is in the closed state, and said gripping ring having a climbing device attachment component, said climbing device attachment component extending outward from the gripping ring and being suitably adapted to secure the climbing device to the gripping ring, said apparatus further comprising a positioning device adapter, said positioning device adapter suitably adapted to be removably attached to a positioning device, and said positioning device adapter further suitably adapted to removably attach the positioning device to the gripping ring, whereby the climbing device is attached to the gripping ring at the climbing device attachment component and the gripping ring is placed onto the upwardly extending object such that the gripping ring substantially encircles the upwardly extending object and the one or more gripping members of the gripping ring engage with the upwardly extending object, holding the gripping ring in place on the upwardly extending object.

* * * * *